(12) United States Patent
Chowanic et al.

(10) Patent No.: US 6,175,803 B1
(45) Date of Patent: Jan. 16, 2001

(54) VEHICLE NAVIGATION ROUTE GENERATION WITH USER SELECTABLE RISK AVOIDANCE

(75) Inventors: Andrea Bowes Chowanic, Bloomfield Township; David Arthur McNamara, Saline, both of MI (US)

(73) Assignee: Ford Global Technologies, Inc., Dearborn, MI (US)

( * ) Notice: Under 35 U.S.C. 154(b), the term of this patent shall be extended for 0 days.

(21) Appl. No.: 09/128,687

(22) Filed: Aug. 4, 1998

(51) Int. Cl.[7] ................................................. G01C 21/00
(52) U.S. Cl. ........................ 701/209; 701/23; 701/25; 701/26; 701/201; 701/209; 701/211; 73/178 R; 940/988; 940/990; 940/995
(58) Field of Search ..................................... 701/209, 211, 701/208, 23, 25, 26, 117, 201, 202; 340/990, 995, 988; 73/178 R

(56) References Cited

U.S. PATENT DOCUMENTS

| | | |
|---|---|---|
| 5,220,507 | 6/1993 | Kirson ................................. 701/202 |
| 5,428,545 | 6/1995 | Maegawa et al. ................... 701/210 |
| 5,452,212 | 9/1995 | Yokoyama et al. .................. 701/211 |
| 5,486,822 | 1/1996 | Tenmoku et al. .................... 340/995 |
| 5,508,930 | 4/1996 | Smith, Jr. ............................. 701/201 |
| 5,610,821 | 3/1997 | Gazis et al. .......................... 455/456 |
| 5,612,882 | 3/1997 | LeFebvre et al. ................... 701/209 |
| 5,729,458 | 3/1998 | Poppen ................................ 705/400 |
| 5,802,492 | * 9/1998 | DeLorme et al. ................... 701/200 |

* cited by examiner

Primary Examiner—William A. Cuchlinski, Jr.
Assistant Examiner—Yonel Beaulieu
(74) Attorney, Agent, or Firm—Mark L. Mollon

(57) ABSTRACT

A navigation system for automotive vehicles generates navigation routes between an initial location and a desired destination using a route criteria including a statistical risk index, such as a CAP crime index score. A user of the navigation system can customize their own desired risk threshold to be used in optimizing the navigation route. A particular route segment with a risk index above a risk threshold can be eliminated from potential routes except when the route segment contains the destination or is a freeway segment. In another embodiment, the weight or cost associated with including a route segment in a navigation route is adjusted according to its statistical risk index.

4 Claims, 3 Drawing Sheets

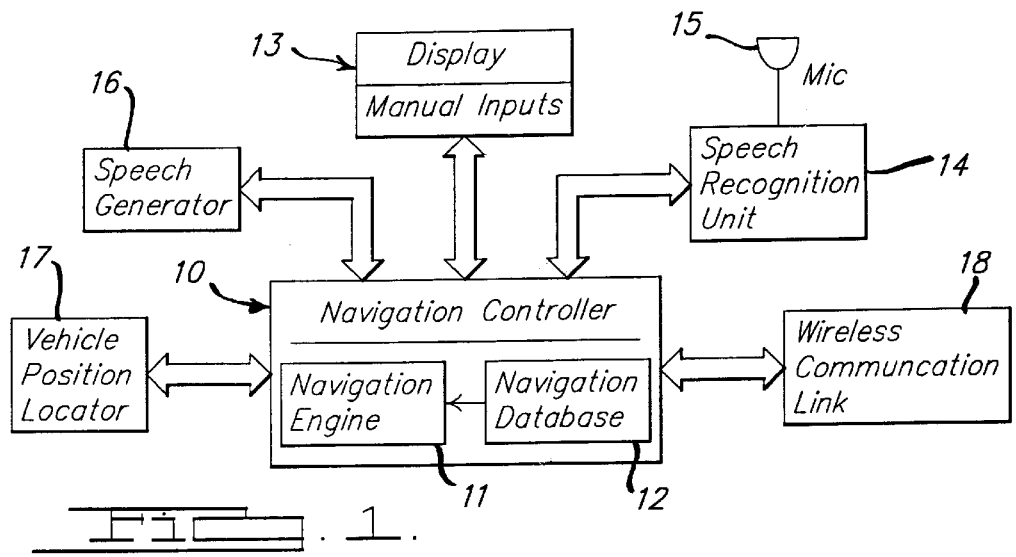
FIG. 1.
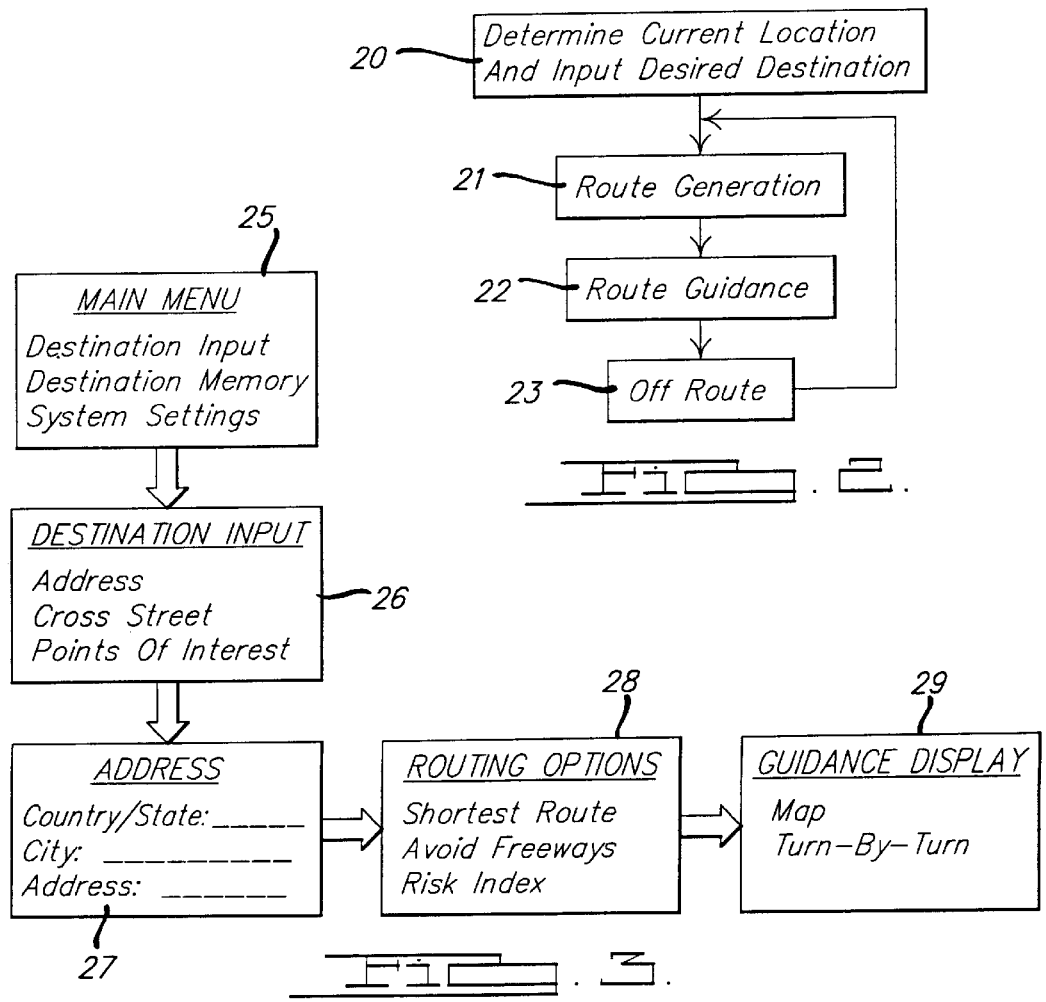
FIG. 2.
FIG. 3.

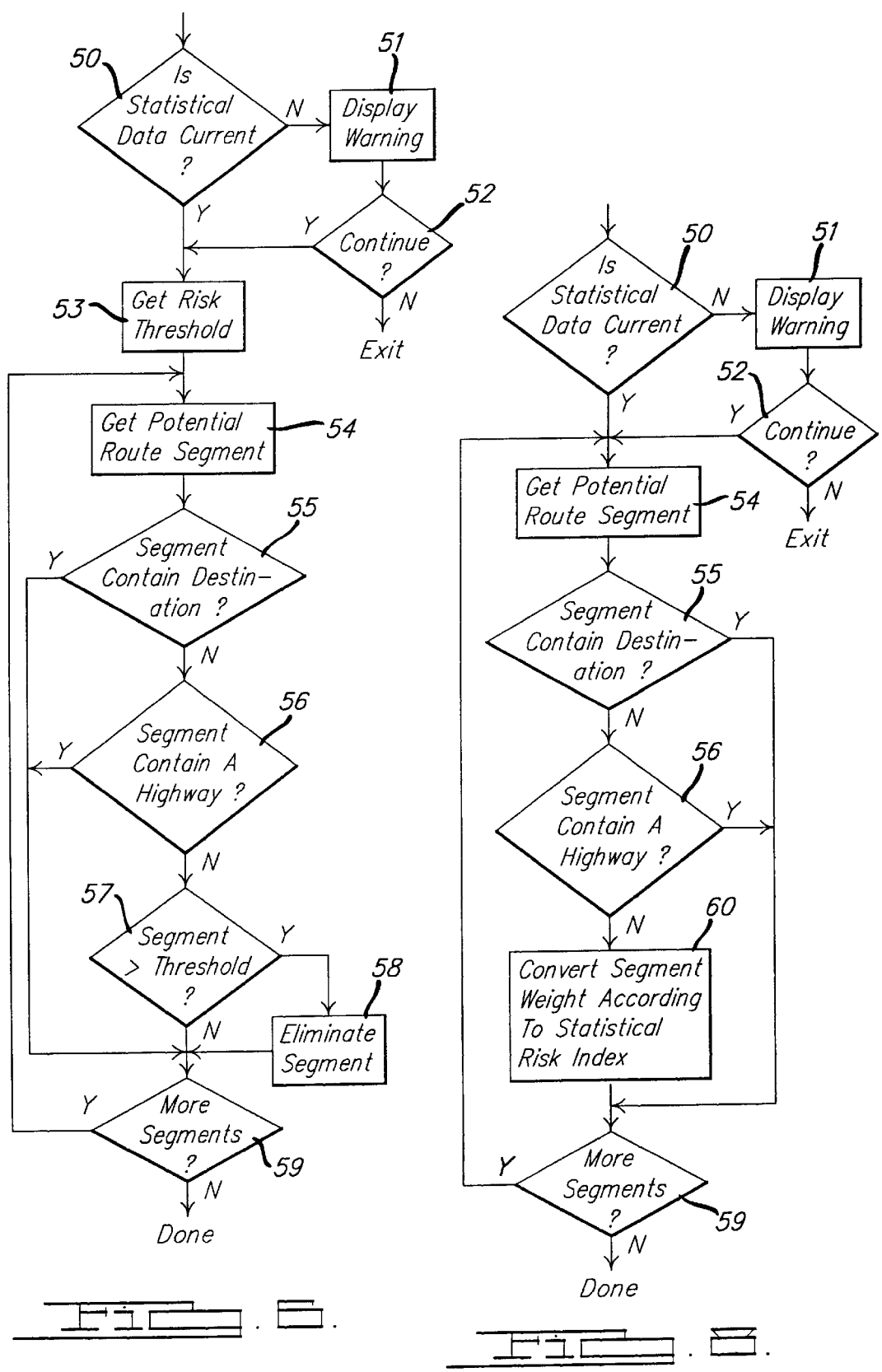

VEHICLE NAVIGATION ROUTE GENERATION WITH USER SELECTABLE RISK AVOIDANCE

BACKGROUND OF THE INVENTION

The present invention relates in general to route generation in vehicle navigation systems, and, more specifically, to route selection criteria including user selectable routing options such as a statistical risk index which allows the user to avoid or minimize the corresponding statistical risk along the generated route.

Vehicle navigation systems have become well known wherein a map database is used to provide navigational assistance to the driver of a vehicle. Based upon a current location and a desired destination, a navigation computer generates an optimum route between the two points. The route may then be displayed visually for the driver. Turn-by-turn instructions and/or a description of the route may be given visually and/or aurally.

Various techniques have been developed for constructing a route which is the most desirable according to predetermined optimization criteria. Typically, the map database is comprised of route segments, each segment connecting two endpoints or intersections. One widely used method for determining an optimal route is the Dijkstra method wherein each route segment in the map database has an associated cost or weight. The total weight of various potential routes between the current location and the destination are calculated and compared so that a route may be selected with the lowest overall weight.

In prior art systems, the optimization criteria is typically comprised of either the shortest route or the fastest route. In addition, selections have been provided for avoiding freeways, maximizing use of freeways, or avoiding tollways, for example. Thus, a route segment may have a plurality of weights and/or other attributes associated with it. For example, there may be a distance weight and a travel-time weight associated with a particular route segment. The generated route may be optimized using the various available weights according to the drivers preferred optimization. In addition, many prior art systems allow the driver to specify a specific route segment to be eliminated from consideration for use in a route, such as when a road is closed for construction or there is an error in the database. Nevertheless, drivers have had little control over route optimization criteria or how they are applied.

Navigation systems may be used to help a driver navigate through areas with which they are not familiar. Other than knowing that a route is optimized for distance, time or avoiding freeways or tollways, etc., the user of a prior art navigation system has not known the prevailing risk characteristics of the areas through which the route passes.

SUMMARY OF THE INVENTION

The present invention has the advantage of providing advanced navigation route generation employing route optimization using a statistical risk index. The user may establish a customized risk threshold for their individually optimized navigation route.

In one aspect, the present invention provides a method of generating a navigation route for a motor vehicle wherein the route connects an initial location with a destination. The navigation route includes a plurality of route segments selected from a database of route segments. The database includes respective attributes associated with respective route segments. The attributes include a statistical risk index that has been measured and indexed to respective route segments. A route criteria is established which is to be optimized over the navigation route. The route criteria includes the statistical risk index. Total weights are compared according to the route criteria for various potential navigation routes. The navigation route is selected as one of the potential navigation routes for which the routing criteria is substantially optimized.

BRIEF DESCRIPTION OF THE DRAWINGS

FIG. 1 is a block diagram showing elements of a navigation system employing the present invention.

FIG. 2 is a flowchart showing the overall operation of a navigation system which may incorporate the present invention.

FIG. 3 shows successive display menus for controlling a navigation system according to the present invention.

FIG. 7 shows the total weight comparison for different potential routes.

FIG. 8 is a flowchart showing an embodiment for modifying route segment weights according to the statistical risk index of the present invention.

DETAILED DESCRIPTION OF THE PREFERRED EMBODIMENTS

Figure 4:
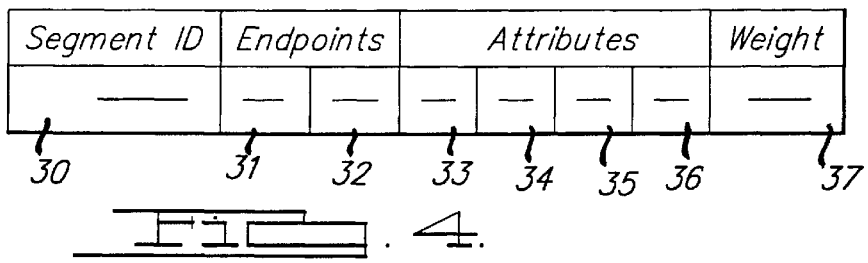
FIG. 4 is a diagram showing the structure of a route segment in a map database.

FIG. 1 shows a navigation system for a vehicle including a navigation controller 10 having a navigation engine 11 and a navigation database 12. A man-machine interface (MMI) 13 includes a visual display, such as an LCD matrix display, and manual inputs, such as push buttons or a keypad. The man-machine interface may also include a speech recognition unit 14 connected to a microphone 15 and to navigation controller 10 for identifying spoken input from a user. A speech generator 16 may also be connected to navigation controller 10 in order to generate audible navigation instructions to the user. A vehicle position locator 17 is coupled to navigation controller 10 for supplying the current vehicle position. Locator 17 may be comprised of a global positioning system (GPS) receiver, vehicle movement sensors, and/or other known vehicle location means. The navigation system may also include a wireless communication link 18 coupled to navigation controller 10 for receiving remotely supplied navigation or traffic data, for example.

An overall method of operation of a navigation system is shown in FIG. 2. In step 20, the current vehicle location is determined and a user inputs their desired destination through manual or spoken inputs. A route is generated in step 31 for traveling from the current location to the desired destination. In step 22, route guidance is provided to the driver so that turning instructions may be followed along the route. During route guidance, the position of the vehicle is monitored to coordinate delivery of turning instructions and for detection of movement off the planned route. If an off-route condition is detected, then an off-route routine is conducted in step 23 which may include recalculation of a new route in step 21.

A series of display menus is shown in FIG. 3 for utilizing the risk index route generation method of the present invention. A MAIN MENU 25 includes selections for destination input, destination memory, and system settings. The planning of a navigational route begins with selection of the "destination input" choice. Next, a DESTINATION INPUT menu 26 appears where the format of the destination input is chosen from choices of address, cross-street, or points of interest. Assuming that the "address" choice is selected, an ADDRESS menu 27 is presented for allowing textual input of a country/state, city, and/or address of the destination. Other appropriate menus would be used for inputting the destination in terms of cross-streets or points of interest.

After the destination has been specified, a ROUTING OPTIONS menu 28 is presented to allow user selection of various routing options to be considered during route generation. For example, the user may select between a shortest route, a route avoiding freeways, or a risk index route calculation.

The risk index preferably is comprised of a statistical risk index such as a crime assessment indexed to the geographic area containing each respective route segment in the database. For example, statistics compiled by law enforcement agencies can be used to generate a numeral score as a measure of the rate of predetermined crimes in a geographic area. In the U.S., this type of data is compiled and marketed by CAP Index, Inc., based upon a weighted average of offenses listed in FBI uniform crime reports. When "risk index" is selected in ROUTING OPTIONS menu 28, the user may be prompted to input a risk threshold indicating what level of risk index is desired to be avoided. The numerical scores may preferably be scaled relative to a national average in order to make the meaning of a risk threshold more understandable. For example, CAP Index, Inc., scales risk index scores so that the national average falls at a score of 100. A risk of half the national average would thus correspond to a risk threshold of 50, for example.

Other statistical risks which could be employed in the present invention include other data such as emergency (police or ambulance) response time, likelihood of congestion, or accident rates.

Once a navigation route is determined in accordance with the routing options, the display presents a GUIDANCE DISPLAY 29 which may include a navigation map and/or turn-by-turn navigation instructions as the vehicle progresses along the determined navigation route.

One format for containing information of a route segment in a database is shown in FIG. 4. In addition, the database may include graphical information or data point plots (not shown) for the map display. A route segment may include a segment ID 30 and end points 31 and 32. The plurality of attributes 33–36 may also be employed, such as data flags indicating whether the route segment is a highway, a toll road, or a one-way street. One or more weights 37 are stored in the database for identifying a time cost and a distance cost associated with the route segment, for example.

Figure 5:
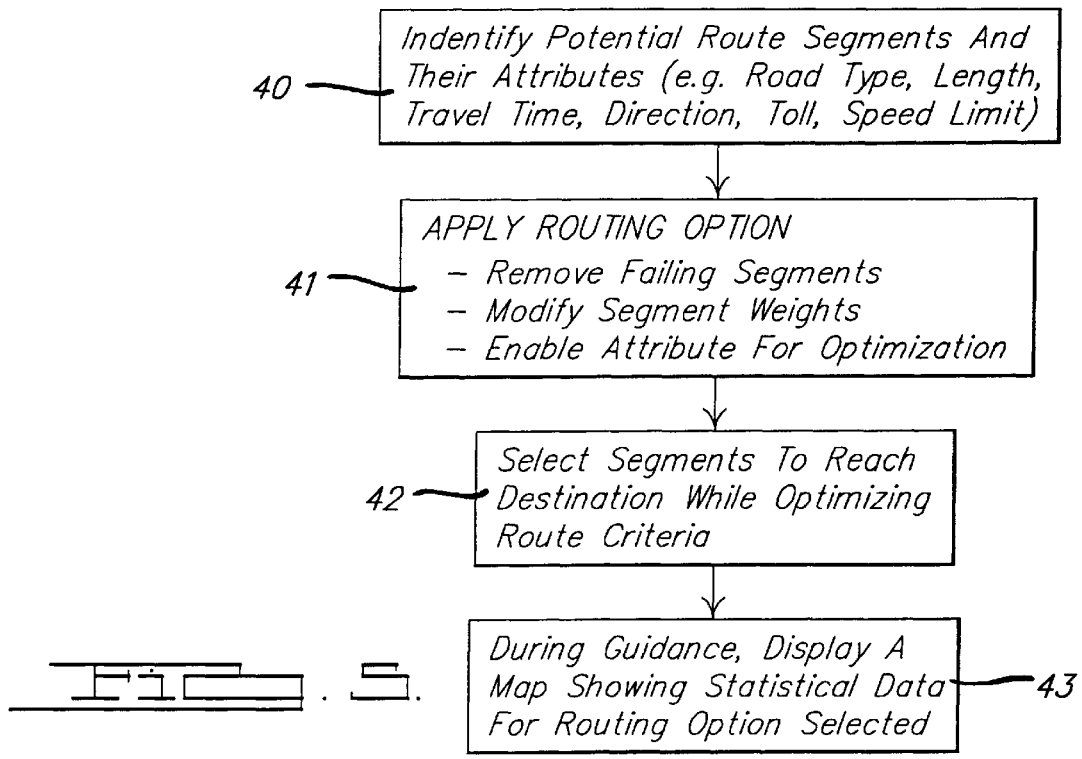
FIG. 5 is a flowchart showing a method of operation of the present invention.

An overall method of the present invention for including a risk index in the overall route selection criteria is shown in FIG. 5. In step 40, potential route segments and their attributes are identified which may possibly be included in the finally selected navigation route. In step 41, the risk index routing option selected by the user is applied to the database. Three alternative embodiments are shown in FIG. 1, including 1) removal from consideration of segments failing the routing option, i.e., those having a risk index higher than the risk threshold, 2) modifying the route segment weights by a factor determined in response to the risk index, or 3) enabling or disabling an attribute or risk index within the route optimization itself, such as either including or excluding a risk index weight factor in the calculation of total weight for any potential route using the Dijkstra method.

In step 42, the route segments are selected which reach the destination while optimizing the route criteria or total weight. In order to maximize the amount of risk index information conveyed to a user, a map may optionally be displayed during the route guidance phase in step 43 showing the statistical data (i.e., numerical risk index) associated with each route segment when the risk index routing option has been selected.

Figure 6:
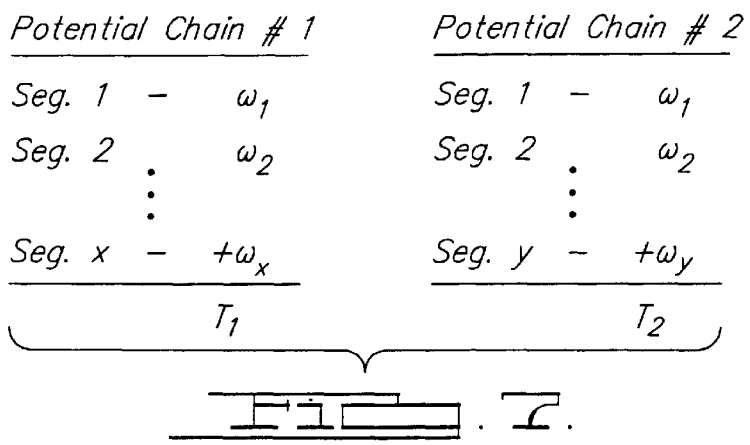
FIG. 6 is a flowchart showing one embodiment for applying the statistical risk index to route generation according to the present invention.

The first embodiment of step 41 (i.e., removing failing route segments according to the risk index) is shown in greater detail in FIG. 6. Since statistical risk data, such as crime assessment data, may change over time, a test is made in step 50 to determine whether the statistical data is current. Preferably, the database (whether contained on a CD ROM or downloaded over the wireless communication link) includes a date field showing when the data was compiled. If a predetermined amount of time has passed since the compilation of the database (e.g., one year), then an "old data" warning is displayed in step 51 to so notify the user. The user is given an option to continue using the available data in step 52. If the user chooses not to use the data then the process is exited. Otherwise, the user may continue and a risk threshold is identified in step 53.

A predetermined risk threshold may be employed in step 53 which has been stored within the navigation controller. Alternatively, the user may be prompted to input a customized risk threshold. In step 54, a potential route segment is obtained. A check is made in step 55 to determine whether the segment contains the desired destination. If it does, then a jump is made to step 59 where a check is made to determine if there are more potential route segments to be examined. If there are more segments, then a return is made to step 54; otherwise the process is done and further conventional steps of route generation are employed.

If the segment did not contain the destination in step 55, then a check is made in step 56 to determine whether the segment contains a highway or freeway attribute. Thus, even though a highway segment may pass through an area with a high value for its crime assessment risk index, highway segments are not affected by the high index. Since freeways are the fastest traveling roads with the least amount of stopping, they might be considered potentially safer even though they pass through an area with a high risk index for crimes. Thus, if the segment is a highway, a jump is made to step 59 to check for more route segments. If the segment does not contain a highway, then a comparison is made in step 57 between the risk index of the route segment and the risk threshold identified in step 53. If the risk index of the segment is greater than the threshold, then the route segment is eliminated from the potential navigational routes in step 58. Then a check is made in step 59 for further route segments.

FIG. 7 shows a typical example for comparing total performance weights for various potential navigation routes. Thus, a potential chain of navigation routes #1 includes a segment 1 with its corresponding weight $w_1$, a segment 2 with its weight $w_2$, and up to a segment x with its weight $w_x$. The total cost or weight of potential chain #1 is the sum of weights $w_1$ through $w_x$ and equals a total cost $T_1$. Likewise, a potential chain #2 contains a different set of route segments up to a segment y with its weight $w_y$. The total weight or cost of potential chain #2 is the sum of individual weights and equals $T_2$. The potential chain with the lower total weight $T_1$ or $T_2$ is the optimized route and would be selected as the final navigation route.

According to the second embodiment of step 41 in FIG. 5, the segment weights can be modified pursuant to the risk index prior to comparing the total performance weight of each potential chain. Such a method is shown in FIG. 8 in greater detail. This method is similar to the method shown in FIG. 6 and identical reference numbers are used for corresponding steps of the method. The method of FIG. 8 differs in that a risk threshold is not used and route segments are not totally eliminated from consideration. Thus, if a route segment is found not to contain the destination in step 55 and not to be a highway in step 56, then the initial weight associated with the route segment is converted according to the statistical risk index. Preferably, the conversion is such that the weight associated with the route segment is increased relative to larger statistical risk indices. In this way, the cost of including a segment in a potential route is greater if the statistical risk index shows a relatively greater risk. A linear formula may be used which modifies each individual weight directly according to the corresponding risk index. Alternatively, the individual weights could be adjusted by predetermined amounts depending upon which of a plurality of predetermined ranges the corresponding risk index falls into.

Regarding the third embodiment of step 41 in FIG. 5, a separate, additional weight value corresponding to the statistical risk index can be stored in the database corresponding to each route segment. The Dijkstra method or other optimization technique used is modified to either take into account or not take into account the additional weight value in determining total weights.

What is claimed is:

1. A method of navigating a motor vehicle along a navigation route connecting an initial location with a destination, said navigation route including a plurality of route segments selected from a database of route segments, said database including respective attributes associated with respective route segments, said attributes including a statistical risk index that has been measured and indexed to respective route segments, each said attribute determining a numerical weight for a respective route segment, said method comprising the steps of:

specifying said destination;

selecting routing options from a group of routing options, wherein said group includes a shortest distance option, a fastest route option, and a risk index option, wherein said selected routing options define a routing criteria to be optimized over said navigation route;

modifying said respective weights in response to said statistical risk index for each respective route segment if said risk index option is selected;

selecting a chain of said route segments as said navigation route, said chain substantially optimizing said routing criteria as compared to other potential chains of said routing segments between said initial location and said destination, said optimizing of said routing criteria is determined by forming sums of weights corresponding to each potential chain of route segments from said initial location to said destination and selecting a chain of route segments having a substantially lowest one of said sums; and guiding a driver of said motor vehicle along said navigation route.

2. The method of claim 1 further comprising the steps of:

specifying a risk threshold; and eliminating route segments from inclusion in said chain of route segments whenever said statistical risk index is greater than said risk threshold, except if said route segment includes said destination.

3. The method of claim 1 further comprising the steps of:

specifying a risk threshold; and eliminating route segments from inclusion in said chain of route segments whenever said statistical risk index is greater than said risk threshold, except if said route segment includes said destination or has an attribute designating said route segment as a highway.

4. The method of claim 1 wherein said statistical risk index is comprised of crime statistics.

* * * * *